United States Patent
Grövlen et al.

(10) Patent No.: US 11,038,630 B2
(45) Date of Patent: Jun. 15, 2021

(54) METHOD PERFORMED BY A WIRELESS DEVICE FOR HANDLING TRANSPORT BLOCK FOR ERROR CORRECTION

(71) Applicant: Telefonaktiebolaget LM Ericsson (publ), Stockholm (SE)

(72) Inventors: Asbjörn Grövlen, Stockholm (SE); Daniel Larsson, Lund (SE); Jung-Fu Cheng, Fremont, CA (US); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/494,882

(22) PCT Filed: Mar. 26, 2018

(86) PCT No.: PCT/SE2018/050313
§ 371 (c)(1),
(2) Date: Sep. 17, 2019

(87) PCT Pub. No.: WO2018/182489
PCT Pub. Date: Oct. 4, 2018

(65) Prior Publication Data
US 2020/0099480 A1 Mar. 26, 2020

Related U.S. Application Data

(60) Provisional application No. 62/480,406, filed on Apr. 1, 2017.

(51) Int. Cl.
*H04L 1/18* (2006.01)
*H04L 5/00* (2006.01)

(52) U.S. Cl.
CPC .......... *H04L 1/1822* (2013.01); *H04L 1/1819* (2013.01); *H04L 1/1835* (2013.01); *H04L 5/0055* (2013.01)

(58) Field of Classification Search
CPC ... H04L 1/1822; H04L 1/1819; H04L 1/1835; H04L 1/1874; H04L 1/1864;
(Continued)

(56) References Cited

U.S. PATENT DOCUMENTS 9,838,162 B2 * 12/2017 Seo .................. H04L 1/1812
10,455,555 B2 * 10/2019 Han .................. H04L 1/1671
(Continued)

FOREIGN PATENT DOCUMENTS

WO 2017006882 A1 1/2017

OTHER PUBLICATIONS

"3GPP TS 36.213 V14.5.0", 3rd Generation Partnership Project; Technical Specification Group Radio Access Network; Evolved Universal Terrestrial Radio Access (E-UTRA); Physical layer procedures (Release 14), Dec. 2017, pp. 1-462.
(Continued)

*Primary Examiner* — Candal Elpenord
(74) *Attorney, Agent, or Firm* — Murphy, Bilak & Homiller, PLLC

(57) ABSTRACT

A method performed by a wireless device (120) for handling a first transport block received from a transmitting device (101) is provided herein. The first transport block comprises a first set of code blocks. At least a first subset of code blocks has been unsuccessfully decoded by the wireless device (120). The wireless device (120) and the transmitting device (101) operate in a wireless communications network (100). The wireless device (120) determines (802), based on a first number of unsuccessfully decoded code blocks, a second number of code blocks to be allocated in a first memory (1111) of the wireless device (120), to store the unsuccessfully decoded code blocks. The wireless device (120) also allocates (803) the determined second number of code blocks. The wireless device (120) then initiates (805) storage
(Continued)

of the unsuccessfully decoded code blocks in the first set, in the allocated determined second number of code blocks.

18 Claims, 8 Drawing Sheets

(58) Field of Classification Search
CPC .... H04L 5/0055; H04W 72/14; H04W 72/04; H04W 72/02; H04W 74/02; H04W 74/0833; H04W 80/02; H04W 80/00
See application file for complete search history.

(56) References Cited

U.S. PATENT DOCUMENTS

| | | | |
|---|---|---|---|
| 2012/0044880 A1* | 2/2012 | Sun | H04W 72/1242 370/329 |
| 2013/0070652 A1 | 3/2013 | Li et al. | |
| 2013/0165183 A1 | 6/2013 | Gerstenberger et al. | |
| 2013/0176981 A1* | 7/2013 | Earnshaw | H04L 1/02 370/329 |
| 2013/0201815 A1* | 8/2013 | Lin | H04L 49/90 370/216 |
| 2015/0103752 A1 | 4/2015 | Yu et al. | |
| 2016/0056926 A1 | 2/2016 | Li et al. | |
| 2016/0088635 A1 | 3/2016 | Davydov et al. | |
| 2016/0270055 A1* | 9/2016 | Larsson | H04W 72/048 |
| 2018/0278368 A1* | 9/2018 | Kim | H04L 5/0094 |
| 2019/0363840 A1* | 11/2019 | Wang | H04L 1/1861 |
| 2020/0021401 A1* | 1/2020 | Guan | H04L 1/1896 |
| 2020/0022158 A1* | 1/2020 | Peng | H04W 28/0236 |
| 2020/0252954 A1* | 8/2020 | Kim | H04L 1/0061 |

OTHER PUBLICATIONS

"3GPP TS 38.306 V15.1.0", 3rd Generation Partnership Project; Technical Specification Group Radio Access Network; NR; User Equipment (UE) radio access capabilities (Release 15), Mar. 2018, pp. 1-25.

"3GPP TS 38.213 V15.1.0", 3rd Generation Partnership Project; Technical Specification Group Radio Access Network; NR; Physical layer procedures for control (Release 15), Mar. 2018, pp. 1-77.

"3GPP TS 38.214 V15.1.0", 3rd Generation Partnership Project; Technical Specification Group Radio Access Network; NR; Physical layer procedures for data (Release 15), Mar. 2018, pp. 1-77.

"3GPP TR 23.799 V1.1.0", 3rd Generation Partnership Project; Technical Specification Group Services and System Aspects; Study on Architecture for Next Generation System (Release 14), Oct. 2016, pp. 1-501.

* cited by examiner

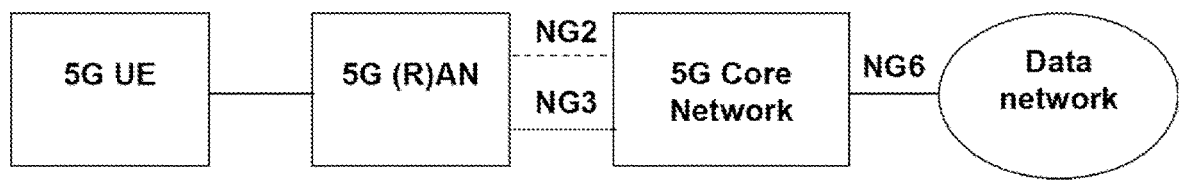
Figure 1
--PRIOR ART--
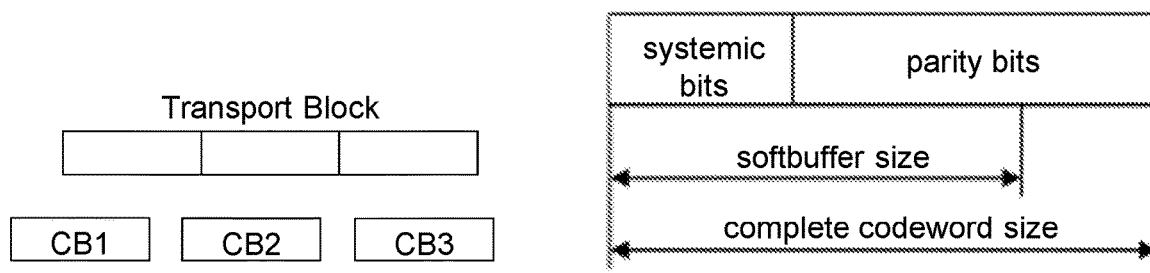
Figure 2
--PRIOR ART--
Figure 3
--PRIOR ART--
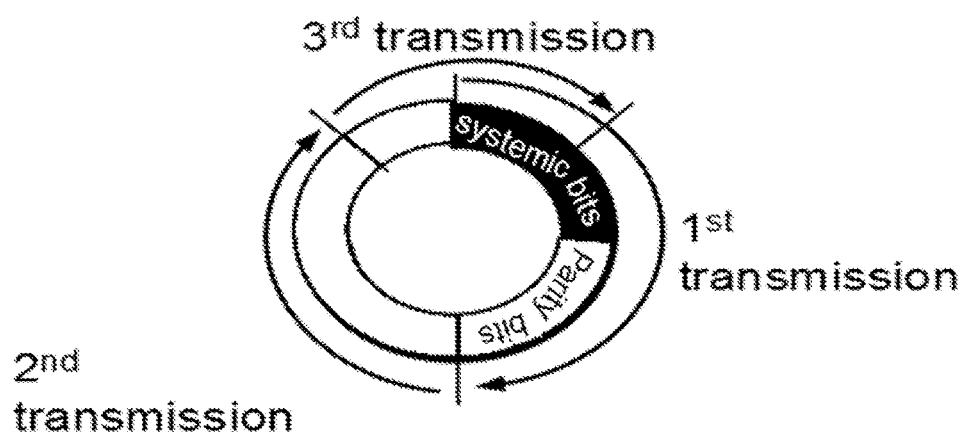
Figure 4
--PRIOR ART--

| SB0 | SB1 | SB2 | SB3 | SB4 | SB5 | SB6 | SB7 |

Figure 5   --PRIOR ART--

| SB0a | SB1a | SB2a | SB3a | SB4a | SB5a | SB6a | SB7a |
| SB0b | SB1b | SB2b | SB3b | SB4b | SB5b | SB6b | SB7b |

Figure 6   --PRIOR ART-- a)
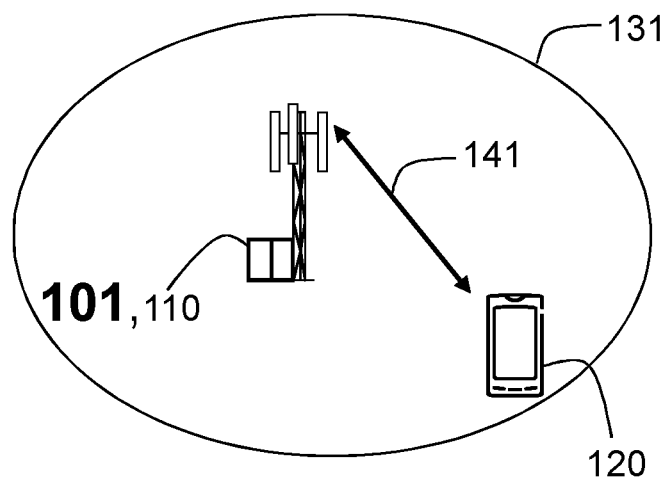
b)
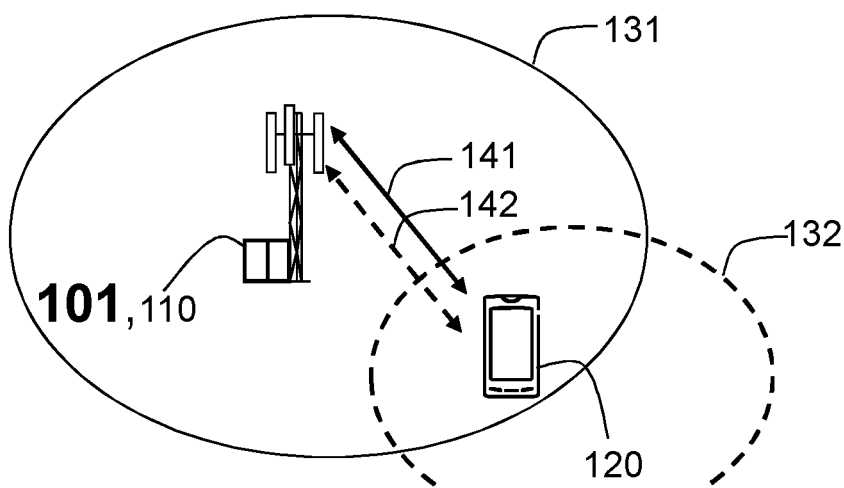
Figure 7

METHOD PERFORMED BY A WIRELESS DEVICE FOR HANDLING TRANSPORT BLOCK FOR ERROR CORRECTION

TECHNICAL FIELD

The present disclosure relates generally to a wireless device and methods performed thereby for handling a first transport block received from a transmitting device. The present disclosure also relates generally to a transmitting device and methods performed thereby for providing a first transport block to a wireless device.

BACKGROUND

Communication devices within a wireless communications network may be wireless devices such as e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In the 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC or 5G CN. The current understanding of various concepts related to this work may be based on input from 3GPP TS 23.799 v1.1.0, and it is summarized below.

Initial High Level Architectural View

FIG. 1 is a schematic representation of the current high level architecture of a system according to the Next Generation, also referred to as a Next Gen System. This high level architecture may be used as a reference model herein. FIG. 1 shows the NextGen UE, NextGen(R)AN, NextGen Core, that is, the core network of the Next Gen System, and their reference points.

If, and possibly how, the NextGen UE may interface with the NextGen Core is currently set for further study.

Reference points in the Next Gen System may be as follows:

NG2: Reference point for the control plane between NextGen (R)AN and NextGen Core.

NG3: Reference point for the user plane between NextGen (R)AN and NextGen Core.

NG1: Reference point for the control plane between NextGen UE and NextGen Core.

NG6: It is the reference point between the NextGen Core and the data network. A data network may be an operator, external, public, or private data network or an intra-operator data network, e.g., for provision of IP Multimedia Services (IMS) services. This reference point corresponds to SGi for 3GPP accesses.

The 5G RAN may comprise base stations supporting evolved LTE and/or New Radio (NR) radio access. The new 5G base station is referred to as a gNB.

The 5G System is expected to support deployments in virtualized environments and introduce support for scaling of a network function instance; as well as dynamic addition or removal of a network function instance.

In modern high data rate communications systems, large amount of data bits may be transmitted at a time in a unit of a transport block (TB). In order to enable faster transmission, a codec may be used. A codec may be understood as a device or program that may enable faster transmission of data by compressing data to be transmitted or decompressing received data. Since it is impractical to implement channel codecs of large block lengths, it may be necessary to divide a large TB into multiple small units called Code Blocks (CB). This procedure is schematically illustrated with a non-limiting example in FIG. 2, which depicts a TB being divided into three CB: CB1, CB2 and CB3. The individual CBs may then be encoded, e.g., turbo encoded, and decoded independently. The number of CBs may vary from one transport block to another, based e.g., on the size of the transport block.

In modern Hybrid Automatic Retransmission Request (HARQ) protocol, incremental redundancy may be used. Instead of re-transmitting the same portion of the codeword, different redundancy versions may be re-transmitted, yielding an extra gain over Chase combining, where every retransmission may be understood to contain the same information. Ideally, full a buffer should be available at the receiver side, such that the received soft values for the entire codeword may be stored. However, due to the terminal complexity and cost concerns, the soft buffer size in a terminal is limited. For higher rate transmissions, where larger codewords may be sent from the transmitter, the UE may have only limited buffer, and may not be able to store the complete codeword. Therefore, the eNB and terminal may need to have the same understanding about the soft buffer size, since otherwise the eNB may transmit coded bits the UE may not be able to store or worse, it may not know these are other bits, and may confuse them with bits it stores. FIG. 3 is a schematic diagram illustrating an encoded transport block and coded bits stored by a terminal, that is, the soft buffer size. FIG. 3 depicts a simplified view of a complete codeword and also how many soft bits the terminal may be able to store. As depicted in the Figure, the encoded transport block comprises systemic bits and parity bits, which together result in the complete codeword size. Systemic bits may contain information bits coming into the channel encoder. Parity bits may be understood as the bits that may be added to the systemic bits to facilitate error detection. FIG. 3 also depicts that the size of the soft buffer is not large enough to store the complete codeword.

If an eNB and a terminal have the same understanding about the soft buffer size, the eNB may never transmit coded bits the terminal may not be able to store. Instead, it may only take those coded bits that are stored by terminal, and may use those bits for transmissions or retransmissions. This may be depicted by the circular buffer shown in FIG. 4. FIG. 4 is a schematic diagram illustrating how bits used in the first transmission and retransmissions may be derived from a circular buffer. The size of the circular buffer matches the soft buffer size of the terminal. It may be noted that the complete circle corresponds to the soft buffer size and not to the entire codeword. The design purpose behind this circular buffer procedure may be understood as that the underlying channel encoder may only produce a certain number of coded bits. When several retransmissions need more bits than that certain number of bits, some of these bits may need to be reused. In the first transmission, depending on the code rate, some or all of the systematic bits and none or some of the parity bits may be transmitted. In a retransmission, the starting position may be changed, and bits corresponding to another part of the circumference may be transmitted. soft bits In LTE, a method may be used whereby the soft buffer may be statically split equally over the HARQ processes. It may also be understood that there may only be one HARQ process associated with TB. In addition, limited buffer rate matching may be used to reduce the soft requirements, by allowing only a subset of the encoded channel bits to be candidates for retransmissions for transport blocks over a certain size. Rate matching may be understood as a part of baseband processing, whereby the number of bits in a transport block (TB) may be matched to the number of bits that may be transmitted in a given allocation. The soft buffer allocation in Rel-8 LTE for the single-layer transmission modes, when the Physical Downlink Shared CHannel (PDSCH) transmission mode is other than mode 3, 4 or 8, is illustrated in FIG. 5. In this schematic illustration, each box represents a soft buffer for a HARQ process, represented as "SB" followed by a number. It may be observed that there is a buffer reserved for each transport block of a HARQ process. The soft buffer allocation for the multi-layer transmission modes is illustrated in FIG. 6. FIG. 6 is a schematic diagram illustrating the soft buffer allocation in Rel-8 LTE, when the PDSCH transmission mode is mode 3, 4 or 8. Also is this schematic representation, each box represents a transport block of the soft buffers is divided in two different boxes, one for each two different transport blocks, which are represented for each of the rows of boxes. A transport block may be transmitted over multiple layers. The soft buffer allocated to each of the transport blocks is represented as "SB", followed by a number and a letter. For every number, software with a different letter, a or b, is allocated, respectively, to a transport block in each layer. It may be observed that the buffer reserved for each transport block is only half of the previous operating case, depicted in FIG. 5. It may be understood that the soft buffer limitation problem is particular acute in MIMO transmission operations. This may be understood to be because the soft buffer for each transport block is only half the size when not used in MIMO transmissions. This limitation reduces the effectiveness of soft combining gains from incremental redundancy retransmissions, since the soft buffer size limitation does not allow to store as many redundancy transmissions.

The cost of the soft buffer is a significant cost of the UE. Therefore, existing methods for soft buffer management may lead to significantly costly UEs, or to suboptimal performance of HARQ processing.

SUMMARY

It is an object of embodiments herein to improve the handling of a soft buffer in a wireless device.

According to a first aspect of embodiments herein, the object is achieved by a method performed by a wireless device. The method is for handling a first transport block received from a transmitting device. The first transport block comprises a first set of code blocks. At least a first subset of code blocks in the first set has been unsuccessfully decoded by the wireless device. The first subset comprises at least one first code block. The wireless device and the transmitting device operate in a wireless communications network. The wireless device determines, based on a first number of unsuccessfully decoded code blocks in the first subset, a second number. The second number is of code blocks to be allocated in a first memory of the wireless device, to store the unsuccessfully decoded code blocks in the first subset. The first memory of the wireless device comprises a plurality of code block buffers available for allocation. The wireless device allocates the determined second number of code blocks for storage of the unsuccessfully decoded code blocks in the first subset. The wireless device then initiates storage of the unsuccessfully decoded code blocks in the first set, in the allocated determined second number of code blocks.

According to a second aspect of embodiments herein, the object is achieved by a method performed by a transmitting device. The transmitting device serves a wireless device. The wireless device and the transmitting device operate in the wireless communications network. The transmitting device obtains a category or capability of the wireless device. The category or capability supports at least one of: a) the maximum number, N, of code block buffers comprised in the plurality of code block buffers available for allocation in the first memory of the wireless device, and b) a maximum size, $K_{max}$, of each code block buffer in the plurality. The transmitting device then determines a second maximum number of code blocks to transmit to the wireless device, based on the obtained category or capability.

According to a third aspect of embodiments herein, the object is achieved by the wireless device, configured to handle the first transport block received from the transmitting device. The first transport block is configured to comprise the first set of code blocks, wherein at least the first subset of code blocks in the first set is configured to have been unsuccessfully decoded by the wireless device. The first subset is configured to comprise at least one first code block. The wireless device and the transmitting device are configured to operate in the wireless communications network. The wireless device is further configured to determine, based on the first number of unsuccessfully decoded code blocks in the first subset, the second number. The second number is of code blocks to be allocated in the first memory of the wireless device, to store the unsuccessfully decoded code blocks in the first subset. The first memory of the wireless device is configured to comprise the plurality of code block buffers available for allocation. The wireless device is also configured to allocate the second number of code blocks configured to be determined for storage of the unsuccessfully decoded code blocks in the first subset. The wireless device is further configured to initiate storage of the unsuccessfully decoded code blocks in the first set, in the determined second number of code blocks configured to be allocated.

According to a fourth aspect of embodiments herein, the object is achieved by the transmitting device, configured to serve the wireless device. The wireless device and the transmitting device are configured to operate in the wireless communications network. The transmitting device is further configured to obtain the category or capability of the wireless device. The category or capability is configured to support at least one of: a) the maximum number, N, of code block buffers comprised in a plurality of code block buffers available for allocation in the first memory of the wireless device; and b) the maximum size, $K_{max}$, of each code block buffer in the plurality. The transmitting device is further configured to determine the second maximum number of code blocks to transmit to the wireless device 120, based on the category or capability configured to be obtained.

By the wireless device determining the second number of code blocks to be allocated, based on the first number of unsuccessfully decoded code blocks in the first subset, the first wireless device is enabled to handle the first memory in a dynamic fashion, and the total size of the first memory, e.g., a soft buffer, may be reduced. In turn, the cost of the wireless device, e.g., a UE, may also be reduced. Furthermore, by specifying the number of code blocks the wireless device may need to store, instead of the number of soft bits, the computational complexity involved in handling the first memory is reduced, by e.g., enabling the simplification of the mapping of the stored information in the first memory to records maintained on the storage.

These advantages may also be facilitated by the transmitting device, based on the category of the wireless device, determining the second maximum number of code blocks to transmit to the wireless device and/or performing link adaptation. This may be understood to be because overflow may be avoided by for example never exceeding the maximum number of code blocks the wireless device may be able to store.

BRIEF DESCRIPTION OF THE DRAWINGS

Examples of embodiments herein are described in more detail with reference to the accompanying drawings, and according to the following description.

FIG. 1 is a schematic diagram illustrating an initial high level architecture view for a NextGen System, according to existing methods.

FIG. 2 is a schematic diagram illustrating division of a transport block into code blocks (CB).

FIG. 3 is a schematic diagram illustrating an encoded transport block and coded bits stored by a terminal, according to a soft buffer size.

FIG. 4 is a schematic diagram illustrating bits used in the first transmission and retransmissions derived from a circular buffer.

FIG. 5 is a schematic diagram illustrating soft buffer allocation in Rel-8 LTE when the PDSCH transmission mode is other than mode 3, 4 or 8.

FIG. 6 is a schematic diagram illustrating soft buffer allocation in Rel-8 LTE when the PDSCH transmission mode is mode 3, 4 or 8.

FIG. 7 is a schematic diagram illustrating two non-limiting examples in a) and b), respectively, of a wireless communications network, according to embodiments herein.

DETAILED DESCRIPTION

Figure 8:
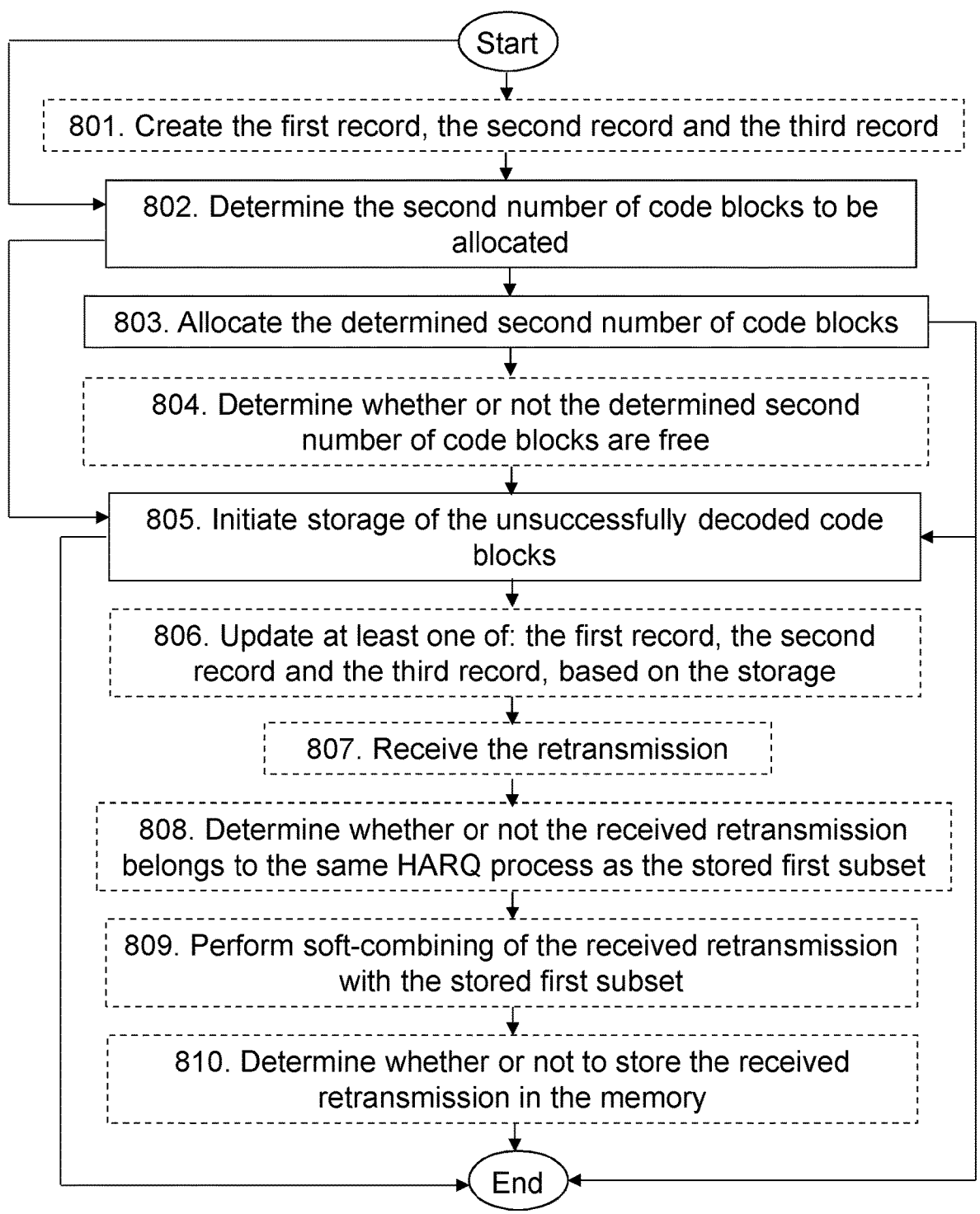
FIG. 8 is a flowchart depicting a method in a wireless device, according to embodiments herein.

As part of the development of embodiments herein, the problems of existing methods will first be identified and discussed.

Existing methods rely on a UE being able to store at least part of all code blocks in all HARQ processes, assuming a maximum code block size. In the vast majority of the operating conditions with a block error rate of 10-30%, the likelihood that all HARQ processes require retransmission is insignificant. Then, most of the soft buffer will be unused. Moreover the UE cost will be unnecessarily high.

Furthermore, the following issues may be also identified in the existing methods. First, the soft buffer may not be able to be shared across HARQ processes. That is, in existing methods, the partition of the soft buffer is done per HARQ process, wherein each HARQ process is allocated a fixed number of CB. Furthermore, the whole TB is stored, comprising successful bits and unsuccessful bits. If a given HARQ process needs more soft buffer memory to be stored than that allocated to it, it may not use soft buffer that has been reserved or allocated to another HARQ process.

Second, there is a limited use of incremental redundancy for large transport block size. In other words, because of the fixed soft buffer size allocated to a HARQ process, depending on the size of a TB, incremental redundancy may not be able to be used, as there may be not enough soft buffer for it.

And third, specifying one common soft buffer in number of stored bits potentially results in minor differences in the rate matching depending on the combination of number of layers and carriers requiring care when defining UE capabilities to ensure consistent behavior across categories.

In order to address these problems, several embodiments are comprised herein. As a summarized overview, embodiments herein may be understood to relate to soft buffer management or handling. In particular, embodiments herein may be understood to relate to dynamic handling of soft buffer. Embodiments herein may relate to any of NR, L1/L2 protocols related to HARQ and soft buffer handling. Particular embodiments herein may relate to soft buffer management in NR.

As a summarized overview, embodiments herein may be understood to relate to, instead of defining a total soft buffer size and a fixed split of the soft buffer size across HARQ processes as is done in existing methods, the UE may be required to have a capacity of storing in the soft buffer a specified number of maximum size code blocks. That is, according to embodiments herein, instead of a static allocation per HARQ process, the allocation may be flexibly performed per code block, independently of HARQ process, so a given HARQ process may be allocated the soft buffer it may need, e.g., if it corresponds to a large TB. The number of code blocks may be set so that the UE may handle typical operation points. The behavior for the UE when running out of empty code blocks may be left for UE implementation.

Any reference herein to a UE, may be understood as being an illustrative example of a wireless device.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 5G has been used in this disclosure to exemplify the embodiments herein, this should not be seen as limiting the scope of the embodiments herein to only the aforementioned system. Other wireless systems, including 3GPP LTE may also benefit from exploiting the ideas covered within this disclosure.

FIG. 7 depicts two non-limiting examples in panels a) and b), respectively, of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiplexing Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a NR network.

The wireless communications network 100 comprises a plurality of transmitting devices, whereof a transmitting device 101 is depicted in the non-limiting example of FIG. 7. In a typical example of embodiments herein, the transmitting device 101 may be a network node, such as the network node 110 described below. This corresponds to the non-limiting example depicted in FIG. 7. In other examples, which are not depicted in FIG. 7, the transmitting device 101 may be a wireless device, as the wireless device 120 described below.

The wireless communications network 100 comprises a plurality of radio network nodes, whereof a network node 110 is depicted in the non-limiting examples of FIG. 7. The network node 110 may be a radio network node, such as e.g., a gNB. That is, a transmission point such as a radio base station, for example an eNB, an eNodeB, or a Home Node B, an Home eNode B or any other network node capable of serving a wireless device, such as a user equipment or a machine type communication device, in the wireless communications network 100. The wireless communications network 100 covers a geographical area which may be divided into cell areas, wherein each cell area may be served by a radio network node, although, one radio network node may serve one or several cells. The network node 110 may serve at least a first cell 131, as depicted in the example of panel a) in FIG. 7. In some examples, the network node 110 may also serve a second cell 132, as depicted in the example of panel b) in FIG. 7. In examples wherein the wireless communications network 100 may not be referred to as a cellular system, the network node 110 may serve receiving nodes, such as wireless devices, with serving beams, the areas of coverage of the beams may still be referred to as cells. The network node 110 may be of different classes, such as, e.g., macro eNodeB, home eNodeB or pico base station, based on transmission power and thereby also cell size. The network node 110 may support one or several communication technologies, and its name may depend on the technology and terminology used. In 5G/NR, the network node 110, which may be referred to as a gNB, may be directly connected to one or more core networks, which are not depicted in FIG. 7.

A plurality of wireless devices is located in the wireless communication network 100, whereof a wireless device 120, is depicted in the non-limiting example of FIG. 7. The wireless device 120 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, Machine-to-Machine (M2M) device, device equipped with a wireless interface, such as a printer or a file storage device, modem, or any other radio network unit capable of communicating over a radio link in a communications system. The wireless device 120 comprised in the wireless communications network 100 is enabled to communicate wirelessly in the wireless communications network 100. The communication may be performed e.g., via a RAN, and possibly the one or more core networks, which may comprised within the wireless communications network 100.

The network node 110 may be a serving radio network node of the wireless device 120. The wireless device 120 may be configured to communicate within the wireless communications network 100 with the network node 110 over a first link 141, e.g., a radio link or first carrier in the first cell 131. The wireless device 120 may be configured to communicate within the wireless communications network 100 with the network node 110 over a second link 142, e.g., a radio link or second carrier in the second cell 132.

In general, the usage of "first" and/or "second" herein may be understood to be an arbitrary way to denote different elements or entities, and may be understood to not confer a cumulative or chronological character to the nouns they modify.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are: a) embodiments related to a wireless device, such as the wireless device 120, e.g., a UE, and b) embodiments related to a transmitting device, such as the network node 110. Embodiments herein may be described with some non-limiting examples. In the following description any reference to a/the gNB may be understood to relate to the transmitting device 101 being the network node 110; and any reference to a/the UE may be understood to relate to the wireless device 120, as a non-limiting example of the wireless device 120, as UE behavior.

Embodiments of a method performed by the wireless device 120, will now be described with reference to the flowchart depicted in FIG. 8. The method may be understood to be for handling a first transport block received from the transmitting device 101. The first transport block comprises a first set of code blocks, wherein at least a first subset of code blocks in the first set has been unsuccessfully decoded by the wireless device 120. The first subset comprises at least one first code block. The wireless device 120 and the transmitting device 101 operate in the wireless communications network 100.

The method may comprise the actions described below. Several embodiments are comprised herein. In some embodiments all the actions may be performed. In some embodiments, one or more actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 8, optional actions are indicated with dashed lines. Some actions may be performed in a different order than that shown in FIG. 8.

Action 801

Figure 11:
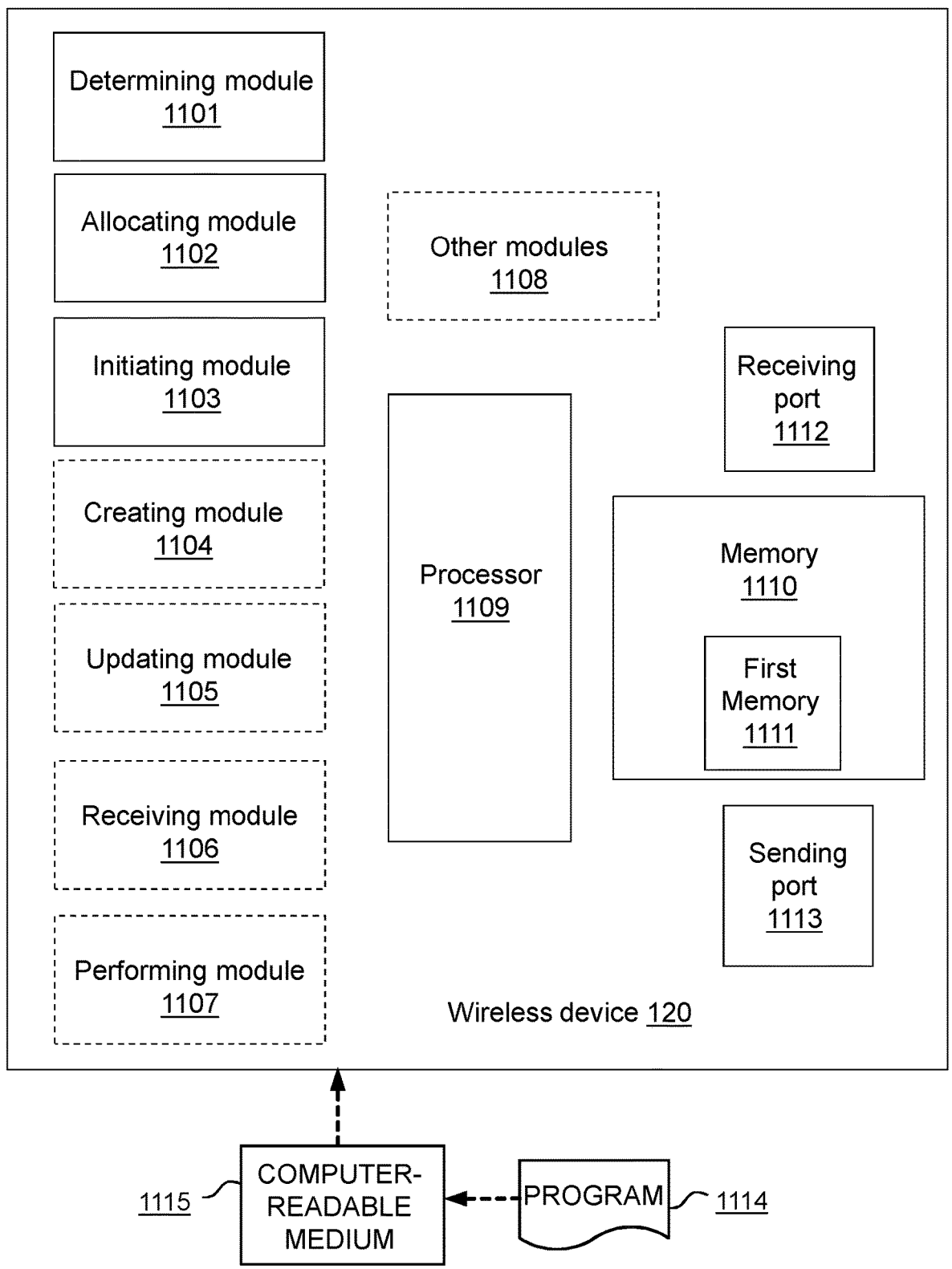
FIG. 11 is a schematic block diagram illustrating embodiments of a wireless device, according to embodiments herein.

The actions of the method described herein may be understood to aim at optimizing the management of the soft buffer so that it may flexibly adapt to the size of the TB received, and so that it may also take advantage of the incremental redundancy, even for a TB of large size. Embodiments herein may be understood to be set in a context wherein the wireless device 120, e.g., a UE, may partition its soft buffer into a number of memory blocks corresponding to the number of maximum sized code blocks given by a specification, e.g., a number of maximum sized code blocks "N". In an advantageous implementation, any reasonable partitioning may be possible. A finer granularity may mean that smaller code blocks may take less space, and the risk of overflow may be further reduced, but may come at the cost of higher complexity in the buffer handling. The wireless device 120 may therefore be understood to comprise a first memory 1111, and the first memory 1111 comprises a plurality of code block buffers available for allocation. An example of first memory is depicted in FIG. 11 as first memory 1111, and will therefore be referred to onwards as first memory 1111. In order to manage the allocation of the code block buffers comprised in the soft buffer, the wireless device 120, in this Action 801, may create at least one of: a) a first record of which code block buffers in the plurality are free and which are occupied, b) a second record of a HARQ process associated with each occupied code block buffer in the plurality, and c) a third record of a component carrier associated with each occupied block buffer in the plurality. In other words, the wireless device 120 may maintain a record of what code blocks in the buffer, that is, which code block buffers, are free and occupied, and in the latter case, which HARQ-process and component carrier the code block may belong to. In a nonlimiting exemplary embodiment, this may be implemented with two tables. One table may contain the occupied or available information of the code block buffers. The available code block buffers may be used to store the soft values of new code blocks that may not be decoded successfully. One table, e.g., another table, may maintain the addresses or indices of the coded block buffers that may be being used to store the soft values of a given HARQ process.

Consequently, each of the first record, the second record, and the third record may be e.g., a table, or an entry in a table.

Free may be understood as empty or unoccupied. Occupied may be understood as comprising stored information, e.g., code blocks, or soft bits.

The component carrier may be e.g., one of the first link 141 and the second link 142.

Action 802

In the course of communications in the wireless communications network 100, the wireless device 120 may have received the first transport block from the transmitting device 101. When a new TB arrives, the wireless device 120 may decode the code blocks. If the decoding fails on at least one of the code blocks, the wireless device 120 may reserve memory for the code block or code blocks that were not successfully decoded. As stated earlier, at least the first subset of code blocks in the first set code blocks comprised in the first transport block has been unsuccessfully decoded by the wireless device 120. In this Action 802, the wireless device 120 determines, based on a first number of unsuccessfully decoded code blocks in the first subset, a second number of code blocks to be allocated, in the first memory of the wireless device 120, to store the unsuccessfully decoded code blocks in the first subset. As stated earlier, the first memory of the wireless device 120 comprises the plurality of code block buffers available for allocation.

Determining may be understood as e.g., calculating. In other words, in this Action 802, the wireless device 120 may calculate how many code block buffers in the first memory 1111 it may need in order to store the unsuccessfully decoded code blocks in the first subset. The first number may, in some examples, be a same number as the second number, or a different number.

The first memory 1111 may be understood as memory to store one or more soft values corresponding to one or more bits of the unsuccessfully decoded code blocks. The first memory 1111 may be e.g., a soft buffer.

In some embodiments, the determining 802 may be further based on a category or capability of the wireless device 120. The category or capability may support at least one of: a) a maximum number, e.g., "N", of code block buffers comprised in the plurality of code block buffers available for allocation in the first memory 1111; and b) a maximum size, e.g., "$K_{max}$", of each code block buffer in the plurality.

According to the foregoing, in some examples, each category of the wireless device 120, e.g., UE category, may have the number N for the number of code blocks it may need to store. It may be noted that the number of code blocks may be calculated based on the maximum code block size. An enhanced UE implementation may save additional code blocks if not all have the maximum size. The total number of code blocks stored may be defined for multiple carriers. It may further be defined for a dual connectivity scenario. It may also be applied jointly for both LTE and NR at the same time. There may be new wireless devices that may be able to connect to both LTE and NR systems at the same time. An advanced wireless device may then share the soft buffers between the LTE and NR connections. In examples wherein the wireless device 120 may have such an ability, the wireless device 120 may decide by itself whether or not to store code blocks from LTE and/or NR, if the wireless device 120 aggregates both NR and LTE cells jointly.

An example with LTE, where the same memory size is assumed, may be the following, wherein for each of UE categories 1-5 as listed in the first column, and the Maximum number of supported layers for spatial multiplexing in DL is shown in the column furthest to the right, corresponding to each of the UE categories listed. According to this, for each UE category, the Maximum number of DownLink Shared CHannel (DL-SCH) transport block bits that may be received within a Transmission Time Interval (TTI) for all layers is shown in the second column, whereas the Maximum number of bits of a DL-SCH transport block received within a TTI per layer, is shown in the third column. Also shown in the fourth column is the Total number of code blocks stored, for each UE category.

Dynamic sharing may be understood as a non-fixed, adaptable sharing of the soft buffers between different HARQ processes and different carriers.

In some embodiments, the first memory 1111 may be partitioned into a third number of first memory 1111 blocks. The third number of first memory 1111 blocks may correspond to the maximum number, N, of code block buffers, according to the maximum size, $K_{max}$, of each code block buffer in the plurality.

Action 803

Once the wireless device 120 has determined the second number of code blocks to be allocated in the first memory 1111, the wireless device 120, in this Action 803, allocates the determined second number of code blocks for storage of the unsuccessfully decoded code blocks in the first subset.

Action 804

In this Action 804, the wireless device 120 may determine whether or not the determined second number of code blocks is free for allocation in the first memory 1111, based on the first record, that is, the first record the wireless device 120 may have created in Action 801. In other words, in this Action 804, the wireless device 120 may check if it has enough free space in its soft buffer to store the unsuccessfully decoded code blocks in the first subset.

The determining 804 whether or not the determined second number of code blocks is free for allocation in the first memory 1111 may be understood to comprise determining whether or not a second subset of code block buffers in the first memory 1111 is free for allocation, the second subset corresponding to the determined second number of code blocks.

The determining in this Action 804 may be based on the first record.

Action 805

In this Action 805, the wireless device 120 initiates storage of the unsuccessfully decoded code blocks in the first set, in the allocated determined second number of code blocks.

Initiating storage may be understood herein as storing, or enabling, triggering or starting the storage. The initiating storage of this Action 805 may comprise initiating storage of

| UE Category | Maximum number of DL-SCH transport block bits received within a TTI for all layers | Maximum number of bits of a DL-SCH transport block received within a TTI per layer | Total number of code blocks stored | Maximum number of supported layers for spatial multiplexing in DL |
|---|---|---|---|---|
| Category 1 | 10296 | 10296 | 14 | 1 |
| Category 2 | 51024 | 51024 | 67 | 2 |
| Category 3 | 102048 | 75376 | 67 | 2 |
| Category 4 | 150752 | 75376 | 100 | 2 |
| Category 5 | 299552 | 149776 | 200 | 4 |

Additionally, according to examples herein, in 3GPP TS 38.213 or 3GPP TS 38.214, a similar section to section 7.1.8 in 36.213 may be used, replacing the formulas with "the UE shall store received soft channel bits corresponding to least M code blocks of size $K_{max}$" where M is given by 38.306.

To encourage more advanced UEs to which the wireless device 120 may belong in some examples, the requirement may be relaxed for dynamic split:

For UEs with no dynamic sharing between carriers, the soft buffer may be of size N code blocks For UEs with dynamic sharing between carriers, the soft buffer may be of size M<C·N where C is the number of supported carriers.

one or more soft values corresponding to one or more bits of the unsuccessfully decoded code blocks in the first set, in the allocated determined second number of code blocks. That is, to a number of code block buffers in the first memory 1111 corresponding to the second number.

The unsuccessfully decoded code blocks in the first subset may be understood to be stored in a second subset of code block buffers in the first memory 1111. The second subset may be understood to correspond to the determined second number of code blocks. The second subset may comprise at least one second code block buffer.

In one implementation, the wireless device 120 may only reserve soft buffer for the number of soft bits received. This may limit the storage if only part of coded bits from the full mother code rate is received. Coded bits may be understood as binary bits that may be generated by the channel encoder at a transmitter. At the receiver side, the coded bits may be received with more value ranges, that is, not necessarily binary, because of e.g., the modulation, demodulation and noise/interference. These received bits are called soft bits. At a retransmission, the number of bits may be increased for the code block based on that more soft bits are received, for example, due to the fact that the gNB, as an example of the transmitting device 101, may have scheduled with a lower code rate or another RV version, or both. A lower code rate transmission may be understood as meaning more coded bits for the same size of information bits which are transmitted. Hence, more soft bits may be received, because more bits were transmitted.

In another implementation, in case of multiple code blocks in a transport block, the wireless device 120 may only store or keep the failed code blocks in the soft buffer. Consequently, in some examples, the code blocks that are successfully decoded, are not stored in the soft buffer memory by the wireless device 120.

In some embodiments, the wireless device 120 may refrain from storing successfully decoded code blocks in the first set, in the first memory 1111 of the wireless device 120. By refraining from storing the successfully decoded code blocks, the wireless device 120 avoids unnecessarily occupying code blocks in its soft buffer, so they may be free to store unsuccessfully decoded blocks.

All correct code blocks may be stored in a separate memory, e.g., a second memory, e.g., in the memory 1110, or independent from the memory 1110. For the correct code blocks, the wireless device 120 may store only the decoded bits or only the systematic bits. This may reduce the memory needed for each code blocks to 20% or less, depending on the number of bits used for each soft bits.

In some embodiments, the initiating in Action 805 of the storage of the unsuccessfully decoded code blocks in the first subset, in the determined second number of code blocks, may be based on a first result of the determination of whether or not a determined second subset of code block buffers corresponding to the determined second number of code blocks is free.

In some embodiments the determined second number of code blocks may be determined to not be free for allocation, that is, the determined second subset of code block buffers may be determined to not be free for allocation. In such embodiments, one of the following may occur: a) the unsuccessfully decoded code blocks in the first subset may not be stored in the first memory 1111, and b) the unsuccessfully decoded code blocks in the first subset may be stored in occupied code block buffers in the first memory 1111; that is the occupied code block buffers may be overwritten with the unsuccessfully decoded code blocks in the first subset.

In other words, when a new TB arrives, the wireless device 120 may decode the code blocks. If the decoding fails on at least one of the code blocks and all of the code block buffers are occupied, the wireless device 120 may select one of the following actions to perform. In a first option, according to option "a" in the previous paragraph, the wireless device 120 may not store the soft values of the current TB. In a second option, according to option "b" in the previous paragraph, the wireless device 120 may select at least one occupied code block buffer and store soft values of said at least one failed code block in said selected code block buffer. In some examples, the wireless device 120 may select said one occupied code block buffer as one code block buffer that has been occupied for the longest time. In other examples, the wireless device 120 may select said one occupied code block buffer as one code block buffer that has the least number of soft values. In yet another example, the wireless device 120 may select said one occupied code block buffer as one code block buffer that stores soft values for a TB that carries low priority traffic data. In a further example, the wireless device 120 may select said one occupied code block buffer as one code block buffer that has low average magnitude of the soft values. This selection may be further based on a residual metric from the algorithm used for the decoding, e.g., the code type. In yet a further example, the wireless device 120 may select said one occupied code block buffer as one code block buffer that has low total sum magnitude of the soft values. This selection may be further based on a residual metric from the algorithm used for the decoding, e.g., the code type. In one more example, the wireless device 120 may select said one occupied code block buffer as one code block buffer belonging to a transport block with a code block buffer that may have been overwritten by the wireless device 120.

Action 806

In this Action 806, the wireless device 120 may update at least one of: a) the first record, b) the second record, and c) the third record, based on the storage of the of the unsuccessfully decoded code blocks in the first subset, in the first memory 1111, which the wireless device 120 may have created in Action 801.

For example, updating may be understood herein as adding, modifying or removing an entry into any of the records, e.g., into any of the tables.

Action 807

In this Action 807, the wireless device 120 may receive a retransmission of the unsuccessfully decoded code blocks in the first subset, e.g., via the first link 141, or the second link 142.

Action 808

After receiving the retransmission in Action 807, in this Action 808, the wireless device 120 may determine whether or not the received retransmission belongs to a same HARQ process as the stored first subset that is the HARQ process corresponding to the original transmission being retransmitted.

The determining in this Action 808 may be based on the updated second record, that is, by accessing or retrieving or consulting the updated second record.

Action 809

When a retransmission arrives, the wireless device 120 may soft combine the retransmission with the code blocks for that HARQ process. Accordingly, in this Action 809, the wireless device 120 may, in some embodiments, perform soft-combining of the received retransmission from Action 807 with the stored first subset, based on a second result of the determining in Action 808 of whether or not the received retransmission belongs to the same HARQ process as the stored first subset. That is, if the second result of the determination in Action 808 is that the retransmission received in Action 807 belongs to the same HARQ process as the stored first subset, it may perform the soft-combining in this Action 809. If, on the other hand, the second result of the determination in Action 808 is that the retransmission received in Action 807 does not belong to the same HARQ process as the stored first subset, it may refrain from performing the soft-combining.

Potentially, the wireless device 120 may perform dual decoding of a code block and try to decode it without soft combining first, and then try a second time to decode with soft combining if the first attempt may have failed.

Action 810

If the retransmission is successful, the wireless device 120 may clear the memory blocks. Accordingly, in this Action 810, the wireless device 120 determines whether or not to store the received retransmission in the first memory 1111, based on whether or not the soft-combined transport block is decoded successfully. That is, if the wireless device 120 is able to successfully decode the soft-combined transport block, it may refrain from storing the received retransmission in the first memory 1111. If, on the other hand, the wireless device 120 is not able to successfully decode the soft-combined transport block, it may determine to store the received retransmission in the first memory 1111, in order to enable another soft-combining with a future retransmission.

Figure 9:
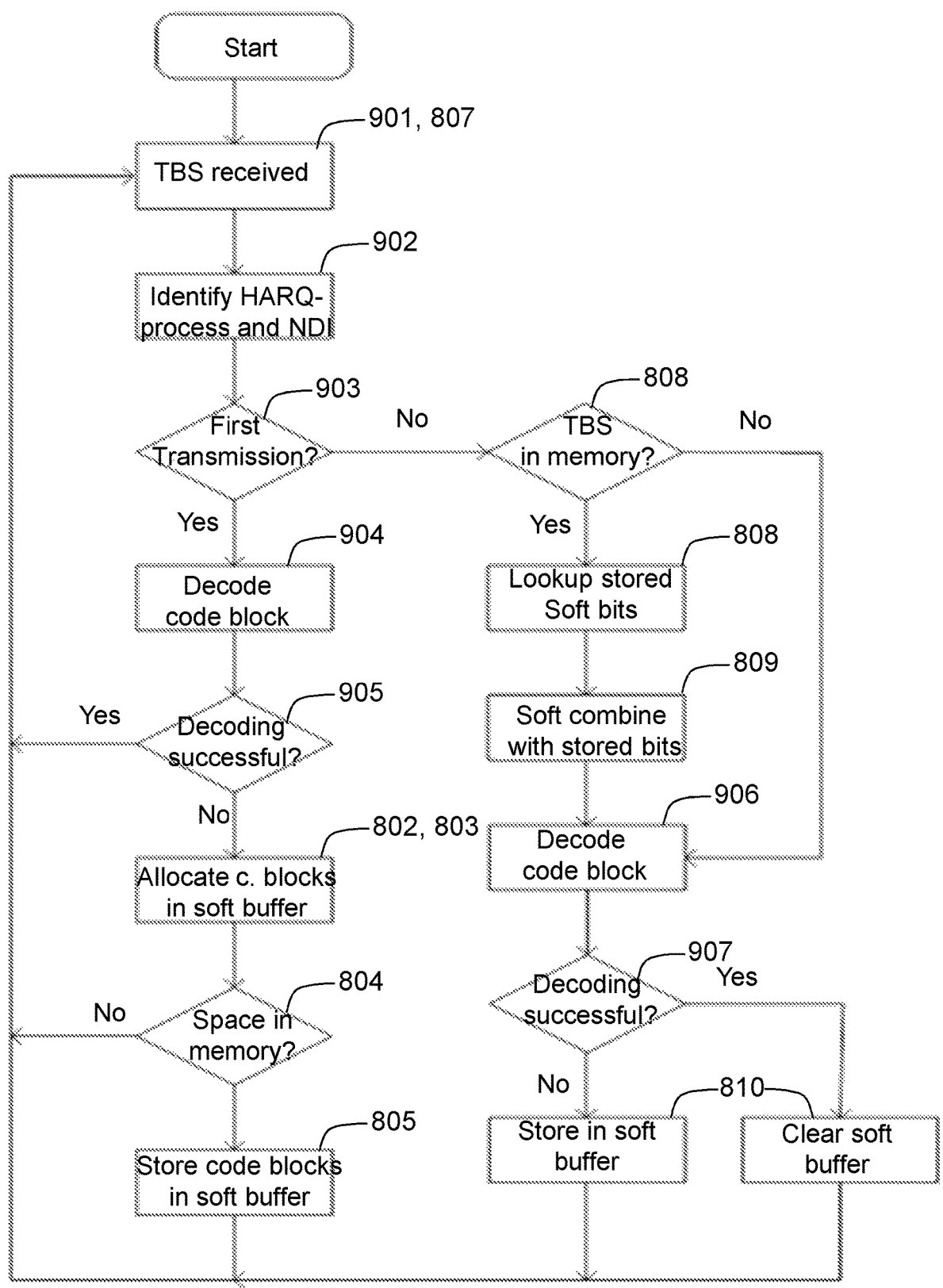
FIG. 9 is a flowchart depicting a non-limiting example of a method in a wireless device, according to embodiments herein.

FIG. 9 is a flowchart illustrating a non-limiting example of embodiments herein of a method performed by the wireless device 120. At the beginning of the method at 901, a TBS is received. If the received TBS is a retransmission, this action may correspond to Action 807. Otherwise, the received TBS may be a first or original transmission. At 902, the wireless device 120 identifies the HARQ process and the New Data Indicator (NDI) corresponding to the received TBS. The NDI may be understood to indicate when a first transmission of a new packet occurs. Based on the identified HARQ process and NDI, at 903 the wireless device 120 determines whether the received TBS is a first transmission or not. If so, the wireless device 120 decodes the code block at 904, and then determines is the decoding was successful or not at 905. If the decoding was not successful, the wireless device 120, in accordance to Action 802 determines the second number of code blocks to be allocated, and in accordance to Action 803, allocates the determined second number of code blocks for storage of the unsuccessfully decoded code blocks in the first subset. Next, the wireless device 120 determines if there is space in its memory to store the unsuccessfully decoded code blocks, that is, according to Action 804, the wireless device 120 then determines whether or not the determined second number of code blocks, is free for allocation in the first memory 1111. As described in Action 805, the wireless device 120 then initiates storage of the unsuccessfully decoded code blocks. If at 905 the decoding is successful or if at Action 804 the wireless device 120 determines that the second number of code blocks is not free for allocation, the method may loop back to 901. If the received TBS is not the first transmission, the wireless device 120 may determine if the TBS is already stored in its memory. This may comprise, according to Action 808, determining whether or not the received retransmission belongs to a previous HARQ process. If so, the wireless device 120 looks up the stored soft bits, also in accordance with Action 808, and then performs soft-combining of the received retransmission with the stored first subset, as explained in Action 809. The wireless device 120 then decodes the soft combined code block at 906, and determines if the decoding was successful at 907. Based on whether or not the soft-combined transport block is decoded successfully, the wireless device 120, in accordance with Action 810, determines whether or not to store the received retransmission in the first memory 1111. If the soft-combined transport block is decoded successfully, the wireless device 120, clears the soft buffer. Otherwise, if the soft-combined transport block is not decoded successfully, the wireless device 120, stores the soft-combined transport block in the soft buffer. If the wireless device 120 determines that the received retransmission does not belong to a previous HARQ process, the wireless device 120 proceeds to decoding the code block without performing soft-combining, and continues as already described.

Figure 10:
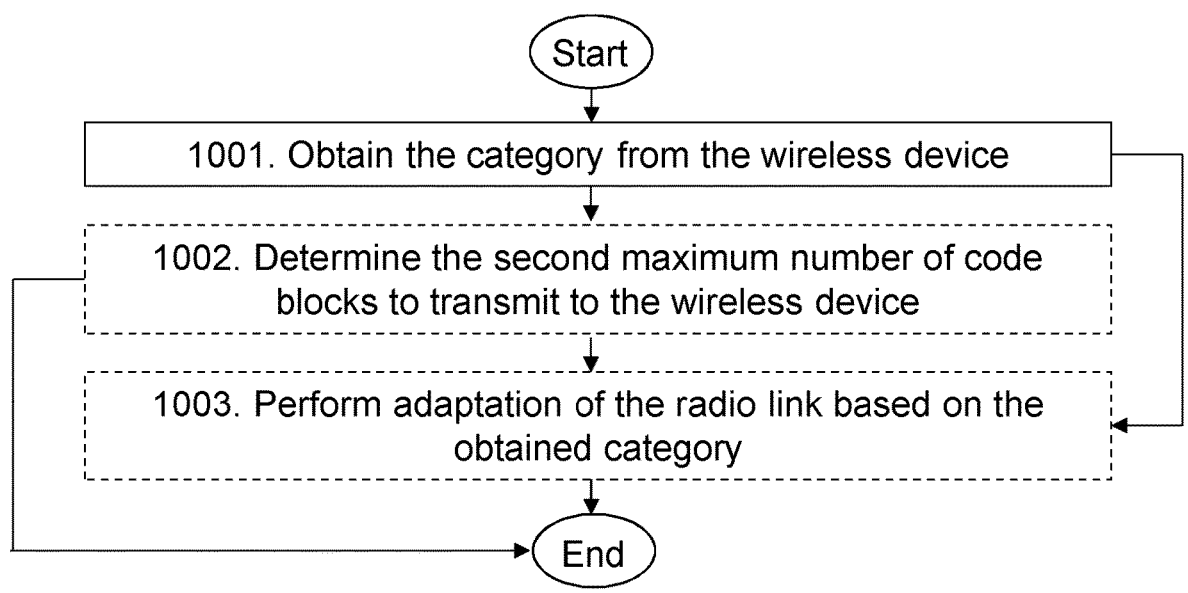
FIG. 10 is a flowchart depicting embodiments of a method in a transmitting device, according to embodiments herein.

Embodiments of a method performed by the transmitting device 101, will now be described with reference to the flowchart depicted in FIG. 10. The transmitting device 101 may be understood to be serving the wireless device 120. The wireless device 120 and the transmitting device 101 operate in the wireless communications network 100. The method may be understood to be for providing the first transport block to the wireless device 120.

In some embodiments, all the actions may be performed. In some embodiments, some actions may be performed. One or more embodiments may be combined, where applicable. It should be noted that the examples herein are not mutually exclusive. Components from one example may be tacitly assumed to be present in another example and it will be obvious to a person skilled in the art how those components may be used in the other examples. All possible combinations are not described to simplify the description. In FIG. 10, optional actions are indicated with dashed lines. Some actions may be performed in a different order than that shown in FIG. 10.

The detailed description of some of the following corresponds to the same references provided above, in relation to the actions described for the wireless device 120, and will thus not be repeated here to simplify the description. For example, the category of the wireless device 120 may be a UE category.

Action 1001

The transmitting device 101 may enable an improved handling of the soft buffer at the wireless device 120 by taking into consideration the characteristics of the first memory 1111 the wireless device 120 may support. In this Action 1001, the transmitting device 101 obtains the category or capability of the wireless device 120. The category or capability supports at least one of: a) the maximum number, e.g., N, of code block buffers comprised in the plurality of code block buffers available for allocation in the first memory 1111 of the wireless device 120; and b) the maximum size, e.g., $K_{max}$, of each code block buffer in the plurality.

Obtaining may be understood as any of: determining, retrieving from a memory, or receiving from the wireless device 120, e.g., via the first link 141 or the second link 142, or from another network node operating in the wireless communications network 100.

Action 1002

In this Action 1001, the transmitting device 101 determines a second maximum number of code blocks to transmit to the wireless device 120, based on the obtained category or capability.

Determining may be understood as e.g., calculating, retrieving from a memory, or receiving from the wireless device 120, e.g., via the first link 141 or the second link 142, or from another network node operating in the wireless communications network 100. By performing this Action 1001, e.g., from the network side, there may be an enhanced base station implementation whereby overflow may be avoided by for example never exceeding the maximum number of code blocks the wireless device 120 may store.

That the determining in this Action 1001 is based on the obtained category or capability may be understood as that e.g., the obtained category or capability may comprise one or more parameters that be used for the determining.

The second maximum number may be considered the same maximum number, e.g., N, of code block buffers comprised in the plurality of code block buffers available for allocation in the first memory 1111 of the wireless device 120, or another, different, number.

Action 1003

Alternatively or in addition, overflow may be avoided by adjusting the link adaptation to reduce the possibility of retransmissions.

In this Action 1003, the transmitting device 101 may perform an adaptation of a radio link, e.g., the first link 141 or the second link 142, between the transmitting device 101 and the wireless device 120, based on the obtained category or capability.

As a summarized view of the foregoing in other words, embodiments herein may be understood to relate to specifying the number of code blocks a UE needs to store instead of the number of soft bits.

Similarly to Action 1002, by performing this Action 1003, overflow may be avoided by for example never exceeding the maximum number of code blocks the wireless device 120 may store. One example of how this may be achieved is that the transmitting device 101 may keep track of how many code block soft buffers are available at the receiver, that is the wireless device 120. It may thus avoid sending more than the wireless device 120 may be able to handle.

An advantage of embodiments herein is that by switching to dynamic handling of the soft buffer, the total soft buffer size may be reduced, and UE cost may therefore be reduced.

To perform the method actions described above in relation to FIG. 8 and/or FIG. 9, the wireless device 120 may comprise the following arrangement depicted in FIG. 11. The wireless device 120 is configured to handle the first transport block received from the transmitting device 101. The first transport block is configured to comprise the first set of code blocks, wherein at least the first subset of code blocks in the first set is configured to have been unsuccessfully decoded by the wireless device 120. The first subset is configured to comprise the at least one first code block. The wireless device 120 and the transmitting device 101 are configured to operate in the wireless communications network 100.

The detailed description of some of the following corresponds to the same references provided above, in relation to the actions described for the wireless device 120, and will thus not be repeated here. For example, the category of the wireless device 120 may be a UE category.

In FIG. 11, optional modules are indicated with dashed boxes.

The wireless device 120 is configured to, e.g. by means of a determining module 1101 within the wireless device 120 configured to, determine, based on the first number of unsuccessfully decoded code blocks in the first subset, the second number of code blocks to be allocated, in the first memory 1111 of the wireless device 120, to store the unsuccessfully decoded code blocks in the first subset. The first memory 1111 of the wireless device 120 is configured to comprise the plurality of code block buffers available for allocation. The determining module 1101 may be a processor 1109 of the wireless device 120, or an application running on such processor.

In some embodiments, to determine may be further based on the category or capability of the wireless device 120, the category or capability being further configured to support at least one of: a) the maximum number, N, of code block buffers configured to be comprised in the plurality of code block buffers available for allocation in the first memory 1111; and b) the maximum size, $K_{max}$, of each code block buffer in the plurality.

The first memory 1111 may be configured to be partitioned into the third number of first memory 1111 blocks. The third number of first memory 1111 blocks may correspond to the maximum number, N, of code block buffers, according to the maximum size, $K_{max}$, of each code block buffer in the plurality.

The wireless device 120 is also configured to, e.g. by means of an allocating module 1102 within the wireless device 120 configured to, allocate the second number of code blocks configured to be determined for storage of the unsuccessfully decoded code blocks in the first subset. The allocating module 1102 may be the processor 1109 of the wireless device 120, or an application running on such processor.

The wireless device 120 is further configured to, e.g. by means of an initiating module 1103 within the wireless device 120 configured to, initiate storage of the unsuccessfully decoded code blocks in the first set, in the determined second number of code blocks configured to be allocated. The initiating module 1103 may be the processor 1109 of the wireless device 120, or an application running on such processor.

In some embodiments, the wireless device 120 may be configured, e.g. by means of a creating module 1104 within the wireless device 120 configured to, create at least one of: a) the first record of which code block buffers in the plurality are free and which are occupied, b) the second record of the HARQ process associated with each occupied code block buffer in the plurality, and c) the third record of the component carrier associated with each occupied block buffer in the plurality. The creating module 1104 may be the processor 1109 of the wireless device 120, or an application running on such processor.

The wireless device 120 may, in some embodiments, be configured to, e.g. by means of determining module 1101 configured to, determine whether or not the second number of code blocks configured to be determined, is free for allocation in the first memory 1111, based on the first record.

In some embodiments, the initiating of the storage of the unsuccessfully decoded code blocks in the first subset, in the second number of code blocks configured to be determined, is configured to be based on the first result of the determination of whether or not the second subset of code block buffers configured to be determined and configured to correspond to the second number of code blocks configured to be determined is free. The wireless device 120 may, in some embodiments, be configured to, e.g. by means of an updating module 1105 within the wireless device 120 configured to, update at least one of: a) the first record, b) the second record, and c) the third record, based on the storage of the of the unsuccessfully decoded code blocks in the first subset, in the first memory 1111. The updating module 1105 may be the processor 1109 of the wireless device 120, or an application running on such processor.

In some embodiments, the wireless device 120 may be configured to, e.g. by means of a receiving module 1106 within the wireless device 120 configured to, receive the retransmission of the unsuccessfully decoded code blocks in the first subset. The receiving module 1106 may be the processor 1109 of the wireless device 120, or an application running on such processor.

The wireless device 120 may, in some embodiments, be configured to, e.g. by means of the determining module 1101 configured to, determine whether or not the retransmission configured to be received belongs to the same HARQ process as the first subset configured to be stored.

In some embodiments, the wireless device 120 may be configured to, e.g. by means of a performing module 1107 within the wireless device 120 configured to perform soft-combining of the retransmission configured to be received with the first subset configured to be stored, based on the second result of the determining of whether or not the retransmission configured to be received belongs to the same HARQ process as the first subset configured to be stored. The performing module 1107 may be the processor 1109 of the wireless device 120, or an application running on such processor.

The wireless device 120 may, in some embodiments, be configured to, e.g. by means of the determining module 1101 configured to, determine whether or not to store the retransmission configured to be received in the first memory 1111, based on whether or not the soft-combined transport block is decoded successfully.

In some embodiments, wherein the determined second subset of code block buffers is configured to be determined to not be free for allocation, one of the following may apply: a) the unsuccessfully decoded code blocks in the first subset may be configured to not be stored in the first memory 1111, and b) the unsuccessfully decoded code blocks in the first subset may be configured to be stored in occupied code block buffers in the first memory 1111.

The wireless device 120 may, in some embodiments, be further configured to refrain from storing successfully decoded code blocks in the first set, in the first memory 1111 of the wireless device 120.

Other modules 1108 may be comprised in the wireless device 120.

The embodiments herein may be implemented through one or more processors, such as a processor 1109 in the wireless device 120 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the wireless device 120. One such carrier may be in the form of a CD ROM disc. It is however feasible with other data carriers such as a memory stick. The computer program code may furthermore be provided as pure program code on a server and downloaded to the wireless device 120.

The wireless device 120 may further comprise a memory 1110 comprising one or more memory units. The memory 1110 is arranged to be used to store obtained information, store data, configurations, schedulings, and applications etc. to perform the methods herein when being executed in the wireless device 120. The memory 1110 may comprise the first memory 1111. In other examples, the first memory 1111 may be independent or not co-located or comprised in the memory 1110.

In some embodiments, the wireless device 120 may receive information from the transmitting device 101 and/or the network node 110, through a receiving port 1112. In some embodiments, the receiving port 1112 may be, for example, connected to one or more antennas in wireless device 120. In other embodiments, the wireless device 120 may receive information from another structure in the wireless communications network 100 through the receiving port 1112. Since the receiving port 1112 may be in communication with the processor 1109, the receiving port 1112 may then send the received information to the processor 1109. The receiving port 1112 may also be configured to receive other information.

The processor 1109 in the wireless device 120 may be further configured to transmit or send information to e.g., transmitting device 101 and/or the network node 110, through a sending port 1113, which may be in communication with the processor 1109, and the memory 1110.

Those skilled in the art will also appreciate that any of the determining module 1101, the allocating module 1102, the initiating module 1103, the creating module 1104, the updating module 1105, the receiving module 1106, the performing module 1107, and the other modules 1108 described above may refer to a combination of analog and digital modules, and/or one or more processors configured with software and/or firmware, e.g., stored in memory, that, when executed by the one or more processors such as the processor 1109, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1101-1108 described above may be implemented as one or more applications running on one or more processors such as the processor 1109.

Thus, the methods according to the embodiments described herein for the wireless device 120 may be respectively implemented by means of a computer program 1114 product, comprising instructions, i.e., software code portions, which, when executed on at least one processor 1109, cause the at least one processor 1109 to carry out the actions described herein, as performed by the wireless device 120. The computer program 1114 product may be stored on a computer-readable storage medium 1115. The computer-readable storage medium 1115, having stored thereon the computer program 1114, may comprise instructions which, when executed on at least one processor 1109, cause the at least one processor 1109 to carry out the actions described herein, as performed by the wireless device 120. In some embodiments, the computer-readable storage medium 1115 may be a non-transitory computer-readable storage medium, such as a CD ROM disc, a memory stick, or stored in the cloud space. In other embodiments, the computer program 1114 product may be stored on a carrier containing the computer program, wherein the carrier is one of an electronic signal, optical signal, radio signal, or the computer-readable storage medium 1115, as described above.

Hence, embodiments herein also relate to the wireless device 120 operative to handle the first transport block received from the transmitting device 101. The first transport block is operative to comprise the first set of code blocks, wherein at least the first subset of code blocks in the first set is operative to have been unsuccessfully decoded by the wireless device 120. The first subset is operative to comprise the at least one first code block. The wireless device 120 and the transmitting device 101 are operative to operate in the wireless communications network 100. The wireless device 120 may comprise a processing circuitry and the memory 1110, said memory 1110 containing instructions executable by said processing circuitry, whereby the wireless device 120 is further operative to perform the actions described herein in relation to the wireless device 120, e.g., in FIG. 8 and/or FIG. 9. The processing circuitry may be understood to correspond to the processor 1109.

The wireless device 120 may comprise an interface unit to facilitate communications between the wireless device 120 and other nodes or devices, e.g., the transmitting device 101, or any of the other nodes. In some particular examples, the interface may, for example, include a transceiver configured to transmit and receive radio signals over an air interface in accordance with a suitable standard.

Figure 12:
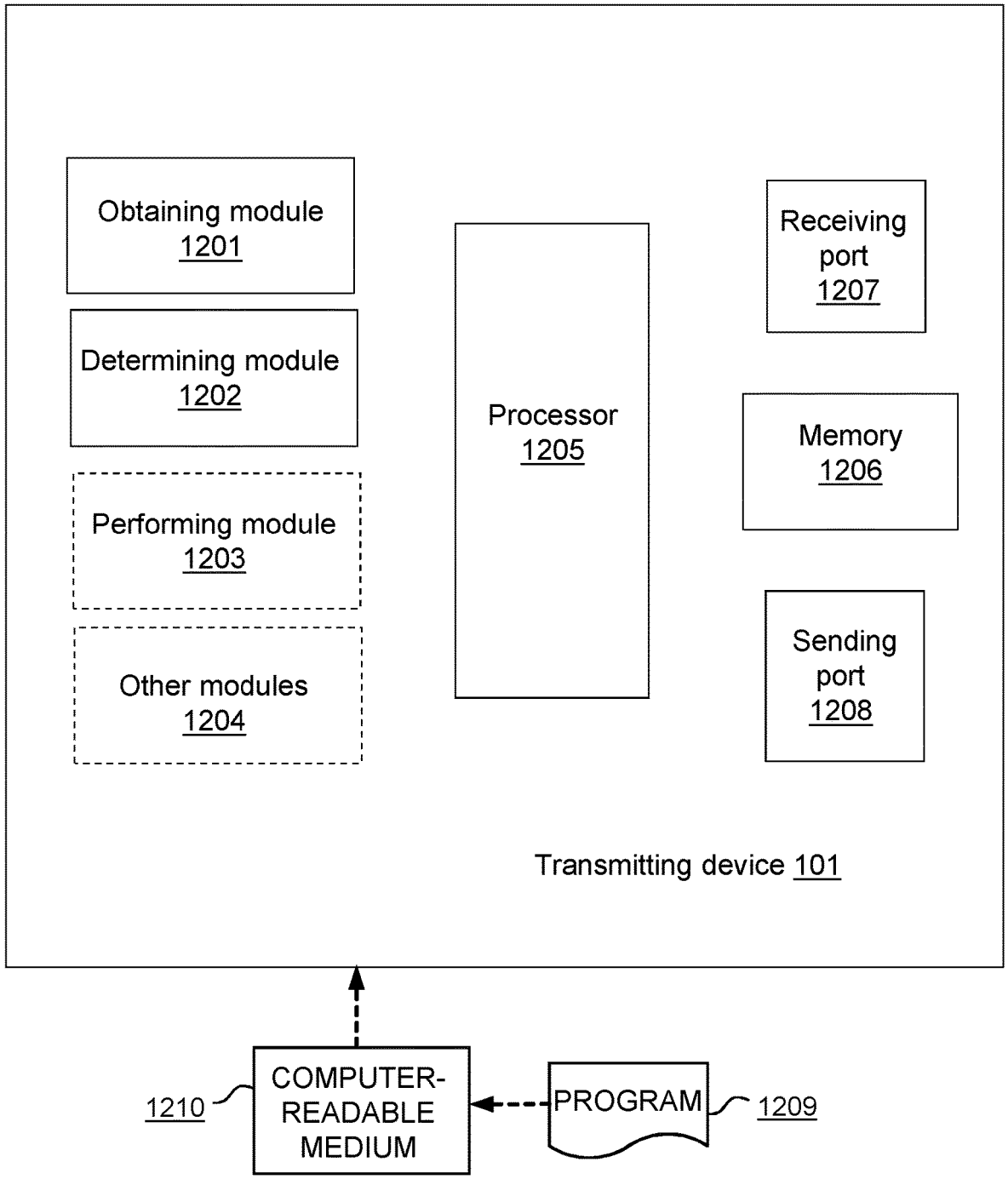
FIG. 12 is a schematic block diagram illustrating embodiments of a transmitting device, according to embodiments herein.

The transmitting device 101 may comprise the following arrangement depicted in FIG. 12.

To perform the method actions described above in relation to FIG. 10, the transmitting device 101 may comprise the following arrangement depicted in FIG. 12. The transmitting device 101 is configured to serve the wireless device 120. The wireless device 120 and the transmitting device 101 are configured to operate in the wireless communications network 100. The transmitting device 101 may be understood to be configured for providing the first transport block to the wireless device 120.

The detailed description of some of the following corresponds to the same references provided above, in relation to the actions described for the transmitting device 101, and will thus not be repeated here. For example, the category of the wireless device 120 may be a UE category.

In FIG. 12, optional modules are indicated with dashed boxes.

The transmitting device 101 is configured to, e.g. by means of an obtaining module 1201 within the transmitting device 101 configured to, obtain the category or capability of the wireless device 120. The category or capability is configured to support at least one of: a) the maximum number, N, of code block buffers comprised in the plurality of code block buffers available for allocation in the first memory 1111 of the wireless device 120; and b) the maximum size, $K_{max}$, of each code block buffer in the plurality. The obtaining module 1201 may be a processor 1205 of the transmitting device 101, or an application running on such processor.

The transmitting device 101 is further configured to, e.g. by means of a determining module 1202 within the transmitting device 101 configured, to determine the second maximum number of code blocks to transmit to the wireless device 120, based on the category or capability configured to be obtained. The determining module 1202 may be the processor 1205 of the transmitting device 101, or an application running on such processor.

In some embodiments, the transmitting device 101 may be configured to, e.g. by means of a performing module 1003 within the transmitting device 101 configured to, perform adaptation of the radio link configured to be between the transmitting device 101 and the wireless device 120, based on the category or capability configured to be obtained. The performing module 1003 may be the processor 1205 of the transmitting device 101, or an application running on such processor.

Other modules 1204 may be comprised in the transmitting device 101.

The embodiments herein may be implemented through one or more processors, such as a processor 1205 in the transmitting device 101 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the transmitting device 101. One such carrier may be in the form of a CD ROM disc. It is however feasible with other data carriers such as a memory stick. The computer program code may furthermore be provided as pure program code on a server and downloaded to the transmitting device 101.

The transmitting device 101 may further comprise a memory 1206 comprising one or more memory units. The memory 1206 is arranged to be used to store obtained information, store data, configurations, schedulings, and applications etc. to perform the methods herein when being executed in the transmitting device 101.

In some embodiments, the transmitting device 101 may receive information from the wireless device 120 and/or other nodes, through a receiving port 1207. In some embodiments, the receiving port 1207 may be, for example, connected to one or more antennas in transmitting device 101. In other embodiments, the transmitting device 101 may receive information from another structure in the wireless communications network 100 through the receiving port 1207. Since the receiving port 1207 may be in communication with the processor 1205, the receiving port 1207 may then send the received information to the processor 1205. The receiving port 1207 may also be configured to receive other information.

The processor 1205 in the transmitting device 101 may be further configured to transmit or send information to e.g., wireless device 120 and/or other nodes, through a sending port 1208, which may be in communication with the processor 1205, and the memory 1206.

Those skilled in the art will also appreciate that the obtaining module 1201, the determining module 1202, the performing module 1203, and the other modules 1204 described above may refer to a combination of analog and digital modules, and/or one or more processors configured with software and/or firmware, e.g., stored in memory, that, when executed by the one or more processors such as the processor 1205, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1201-1204 described above may be implemented as one or more applications running on one or more processors such as the processor 1205.

Thus, the methods according to the embodiments described herein for the transmitting device 101 may be respectively implemented by means of a computer program 1209 product, comprising instructions, i.e., software code portions, which, when executed on at least one processor 1205, cause the at least one processor 1205 to carry out the actions described herein, as performed by the transmitting device 101. The computer program 1209 product may be stored on a computer-readable storage medium 1210. The computer-readable storage medium 1210, having stored thereon the computer program 1209, may comprise instructions which, when executed on at least one processor 1205, cause the at least one processor 1205 to carry out the actions described herein, as performed by the transmitting device 101. In some embodiments, the computer-readable storage medium 1210 may be a non-transitory computer-readable storage medium, such as a CD ROM disc, a memory stick, or stored in the cloud space. In other embodiments, the computer program 1209 product may be stored on a carrier containing the computer program, wherein the carrier is one of an electronic signal, optical signal, radio signal, or the computer-readable storage medium 1210, as described above.

Hence, embodiments herein also relate to the transmitting device 101 operative to serve the wireless device 120, the wireless device 120 and the transmitting device 101 being operative to operate in the wireless communications network 100. The transmitting device 101 may comprise a processing circuitry and the memory 1206, said memory 1206 containing instructions executable by said processing circuitry, whereby the transmitting device 101 is further operative to perform the actions described herein in relation to the transmitting device 101, e.g., in FIG. 10. The processing circuitry may be understood to correspond to the processor 1205.

The transmitting device 101 may comprise an interface unit to facilitate communications between the transmitting device 101 and other nodes or devices, e.g., the wireless device 120, or any of other nodes. In some particular examples, the interface may, for example, include a transceiver configured to transmit and receive radio signals over an air interface in accordance with a suitable standard.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The term module may be understood herein as being equivalent to the term unit.

The term processor may be understood to refer to a hardware component, e.g., a processing circuit.

The invention claimed is:

1. A method, performed by a wireless device, for handling a first transport block received from a transmitting device in a wireless communications network, the first transport block comprising a first set of code blocks including at least a first subset that were unsuccessfully decoded by the wireless device, the first subset including at least one code block, the method comprising:
based on a first number of unsuccessfully decoded code blocks of the first subset, determining a second number of code blocks to be allocated, in a first memory of the wireless device, to store the unsuccessfully decoded first subset of code blocks, wherein the first memory of the wireless device comprises a plurality of code block buffers available for allocation;
allocating the determined second number of code blocks for storage of the unsuccessfully decoded first subset of code blocks; and
initiating storage of the unsuccessfully decoded code blocks of the first subset in the allocated determined second number of code blocks.

2. The method according to claim 1, wherein the method further comprises refraining from storing successfully decoded code blocks, of the first set, in the first memory of the wireless device.

3. The method according to claim 1, wherein determining the second number is further based on a category or capability of the wireless device, the category or capability supporting at least one of the following:
a maximum number (N) of code block buffers available for allocation in the first memory; and
a maximum size ($K_{max}$) of each code block buffer available for allocation in the first memory.

4. The method according to claim 3, wherein the first memory is partitioned into a third number of first memory blocks, the third number of first memory blocks corresponding to the maximum number (N) of code block buffers, according to the maximum size ($K_{max}$) of each code block buffer.

5. The method according to claim 1, further comprising:
creating at least one of the following:
a first record of which code block buffers in the plurality are free and which are occupied,
a second record of a Hybrid Automatic Retransmission Request (HARQ) process associated with each occupied code block buffer, and
a third record of a component carrier associated with each occupied code block buffer;
based on the first record, determining whether the second number of code blocks is free for allocation in the first memory, wherein initiating storage of the unsuccessfully decoded code blocks of the first subset is based on a result of determining whether the second number of code blocks is free for allocation in the first memory; and
based on the storage of the of the unsuccessfully decoded code blocks of the first subset in the first memory, updating at least one of the following: the first record, the second record, and the third record.

6. The method according to 5, further comprising:
receiving a retransmission of the unsuccessfully decoded code blocks of the first subset;
determining whether the received retransmission belongs to the same HARQ process as the stored first subset;
based on a result of determining whether the received retransmission belongs to the same HARQ process as the stored first subset, performing soft-combining of the received retransmission with the stored first subset to form a soft-combined transport block; and
determining whether to store the received retransmission in the first memory based on whether the soft-combined transport block is decoded successfully.

7. The method according to 5, wherein based on determining that the second number of code blocks is not free for allocation in the first memory, the unsuccessfully decoded code blocks of the first subset are processed according to one of the following:
not stored in the first memory, or
stored in occupied code block buffers in the first memory.

8. A method performed by a transmitting device serving a wireless device in a wireless communication network, the method comprising:
obtaining a category or capability of the wireless device, the category or capability supporting at least one of the following:
a maximum number (N) of code block buffers available for allocation in a first memory of the wireless device, and
a maximum size ($K_{max}$) of each code block buffer available for allocation in the first memory;
transmitting, to the wireless device, a transport block of data comprising a plurality of code blocks;
determining that a second number of code block buffers are allocated in a first memory of the wireless device to store a first subset, of the plurality of code blocks, that were unsuccessfully decoded by the wireless device; and
based on the obtained category or capability and the second number, determining a maximum number of code blocks to transmit to the wireless device.

9. The method according to claim 8, further comprising performing adaptation of a radio link between the transmitting device and the wireless device, based on the obtained category or capability.

10. A wireless device configured to handle a first transport block received from a transmitting device in a wireless communications network, the first transport block comprising a first set of code blocks including at least a first subset that were unsuccessfully decoded by the wireless device, the first subset including at least one code block, the wireless device comprising:
 a receiving port configured to receive at least the first transport block from the transmitting device;
 a first memory comprising a plurality of code block buffers available for allocation; and
 a processor operably coupled to the receiving port and configured to execute instructions that cause the wireless device to:
  based on a first number of unsuccessfully decoded code blocks of the first subset, determine a second number of code blocks to be allocated, in the first memory, to store the unsuccessfully decoded first subset of code blocks;
  allocate the determined second number of code blocks for storage of the unsuccessfully decoded first subset of code blocks; and
  initiate storage of the unsuccessfully decoded code blocks of the first subset in the allocated determined second number of code blocks.

11. The wireless device according to claim 10, wherein the processor is further configured to execute instructions that cause the wireless device to refrain from storing successfully decoded code blocks, of the first set, in the first memory of the wireless device.

12. The wireless device according to claim 10, wherein execution of the instructions causes the wireless device to determine the second number further based on a category or capability of the wireless device, the category or capability being further configured to support at least one of the following:
 a maximum number (N) of code block buffers available for allocation in the first memory; and
 a maximum size ($K_{max}$) of each code block buffer available for allocation in the first memory.

13. The wireless device according to claim 12, wherein the first memory is partitioned into a third number of first memory blocks, the third number of first memory blocks corresponding to the maximum number (N) of code block buffers, according to the maximum size ($K_{max}$) of each code block buffer.

14. The wireless device according to claim 10, wherein the processor is further configured to execute instructions that cause the wireless device to:
 create at least one of the following:
  a first record of which code block buffers in the plurality are free and which are occupied,
  a second record of a Hybrid Automatic Retransmission Request (HARQ) process associated with each occupied code block buffer, and
  a third record of a component carrier associated with each occupied code block buffer;
 based on the first record, determine whether the second number of code blocks is free for allocation in the first memory, wherein initiating storage of the unsuccessfully decoded code blocks of the first subset is based on a result of determining whether the second number of code blocks is free for allocation in the first memory; and
 based on the storage of the of the unsuccessfully decoded code blocks of the first subset in the first memory, update at least one of the following: the first record, the second record, and the third record.

15. The wireless device according to 14, wherein the processor is further configured to execute instructions that cause the wireless device to:
 receive a retransmission of the unsuccessfully decoded code blocks of the first subset;
 determine whether the received retransmission belongs to the same HARQ process as the stored first subset;
 based on a result of determining whether the received retransmission belongs to the same HARQ process as the stored first subset, perform soft-combining of the received retransmission with the stored first subset to form a soft-combined transport block; and
 determine whether to store the received retransmission in the first memory based on whether the soft-combined transport block is decoded successfully.

16. The wireless device according to 14, wherein based on a determination that the second number of code blocks is not free for allocation in the first memory, the execution of the instructions causes the wireless device to process the unsuccessfully decoded code blocks of the first subset according to one of the following:
 not stored in the first memory, or
 stored in occupied code block buffers in the first memory.

17. A transmitting device configured to serve a wireless device in a wireless communications network, the transmitting device comprising:
 a receiving port configured to communicate with the wireless device;
 a processor operably coupled to the receiving port and configured to execute instructions that cause the transmitting device to:
  obtain a category or capability of the wireless device, the category or capability supporting at least one of the following:
   a maximum number (N) of code block buffers available for allocation in a first memory of the wireless device, and
   a maximum size ($K_{max}$) of each code block buffer available for allocation in the first memory; and
  transmit, to the wireless device, a transport block of data comprising a plurality of code blocks;
  determine that a second number of code block buffers are allocated in a first memory of the wireless device to store a first subset, of the plurality of code blocks, that were unsuccessfully decoded by the wireless device; and
  based on the obtained category or capability and the second number, determine a maximum number of code blocks to transmit to the wireless device.

18. The transmitting device according to claim 17, wherein the processor is further configured to execute instructions that cause the transmitting device to perform adaptation of a radio link between the transmitting device and the wireless device, based on the obtained category or capability obtained.

* * * * *